US012083523B2

(12) United States Patent
Golway et al.

(10) Patent No.: US 12,083,523 B2
(45) Date of Patent: Sep. 10, 2024

(54) TILTABLE STAGES AND METHODS OF USING THE SAME

(71) Applicant: Advanced Solutions Life Sciences, LLC, Louisville, KY (US)

(72) Inventors: Michael Golway, Louisville, KY (US); Scott Cambron, Louisville, KY (US)

(73) Assignee: ADVANCED SOLUTIONS LIFE SCIENCES, LLC, Louisville, KY (US)

( * ) Notice: Subject to any disclaimer, the term of this patent is extended or adjusted under 35 U.S.C. 154(b) by 176 days.

(21) Appl. No.: 17/831,992

(22) Filed: Jun. 3, 2022

(65) Prior Publication Data

US 2022/0388007 A1 Dec. 8, 2022

Related U.S. Application Data

(60) Provisional application No. 63/196,921, filed on Jun. 4, 2021.

(51) Int. Cl.
*B01L 9/00* (2006.01)

(52) U.S. Cl.
CPC .................................... *B01L 9/52* (2013.01)

(58) Field of Classification Search
CPC ...... B01L 9/52; B01L 9/523; B01L 2200/025; B01L 2300/0861
USPC ................................................ 248/371, 133
See application file for complete search history.

(56) References Cited

U.S. PATENT DOCUMENTS 277,544 A * 5/1883 Chappell ................ F16M 11/10 248/371
4,770,381 A 9/1988 Gold
5,284,623 A 2/1994 Yamori et al.
6,442,851 B1 * 9/2002 Botos .................. B23Q 1/5406 33/1 M
7,533,856 B2 * 5/2009 Mollenhauer .......... F16M 11/10 248/598
2001/0002985 A1 6/2001 Kleinsasser
2004/0021044 A1 2/2004 Lindsay
2006/0081756 A1 * 4/2006 Hallett ................ A47C 15/008 248/371
2016/0334429 A1 * 11/2016 Abe ................... G01N 35/0099
2017/0080431 A1 * 3/2017 Eberle .................... C12M 23/48
2019/0002809 A1 1/2019 Oakley et al.
2021/0016280 A1 * 1/2021 Flesher ............. B01L 3/502715
2022/0072557 A1 * 3/2022 Chou .................. G01N 1/2806
2022/0388007 A1 * 12/2022 Golway .................... B01L 9/52
(Continued)

FOREIGN PATENT DOCUMENTS

EP 2674264 A2 12/2013

OTHER PUBLICATIONS

"Types of Bearings—A Thomas Buying Guide" Thomas, Mar. 9, 2021, <URL:http:/web.archive.org/web/20210309221026/http://www.thomasnet.com/articles/machinery-tools-supplies/bearing-types/>.

(Continued)

*Primary Examiner* — Muhammad Ijaz
(74) *Attorney, Agent, or Firm* — Dinsmore & Shohl LLP

(57) ABSTRACT

A tiltable stage assembly includes a base and a tiltable stage operably coupled to the base and pivotable relative to the base. The tiltable stage is moveable between an initial position and a tilted position, wherein the tiltable stage is parallel with the base in the initial position and is oriented at an angle to the base when in the tilted position. The tiltable stage is biased to the initial position.

18 Claims, 13 Drawing Sheets

(56) References Cited

U.S. PATENT DOCUMENTS

2024/0012231 A1* 1/2024 Taylor .................. G01N 1/2813

OTHER PUBLICATIONS

International Search Report and Written Opinion dated Aug. 30, 2022 pertaining to WO application No. PCT/US2022/032133 filed Jun. 3, 2022, pp. 1-12.

* cited by examiner

TILTABLE STAGES AND METHODS OF USING THE SAME

CROSS REFERENCE TO RELATED APPLICATION

This application claims priority to U.S. Provisional Application Ser. No. 63/196,921 filed on Jun. 4, 2021, the entire disclosure of which is hereby incorporated by reference.

TECHNICAL FIELD

The present specification generally relates to the field of stages, stage assemblies, and associated methods of use.

BACKGROUND

Stages may be used in a variety of applications. In general, a stage may provide a base for an object within a larger system. For example, a stage may provide a base for a well plate containing biomaterials or other samples within wells of the well plate. In such an example, the stage may be disposed within a system including a robotic arm configured to access the samples of the well plate.

Many conventional stages are stationary and therefore require human intervention in order to tilt the stage or tilt an object, such as a well plate, upon the stage. This may interrupt a workflow and slow down associated processes.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In a first aspect A1, a tiltable stage assembly includes a base and a tiltable stage. The tiltable stage is operably coupled to the base and pivotable relative to the base. The tiltable stage is moveable between an initial position and a tilted position. The tiltable stage is parallel with the base in the initial position and is oriented at an angle to the base when in the tilted position. The tiltable stage is biased to the initial position.

In a second aspect A2 according to the first aspect A1, the tiltable stage assembly further includes a stage stop. The stage stop is positioned to contact the tiltable stage when the tiltable stage is in the tilted position, thereby defining a maximum tilt angle of the tiltable stage.

In a third aspect A3 according to the second aspect A2, the stage stop extends between a first end and a second end, wherein the stage stop is coupled to the base at the first end and is configured to contact the tiltable stage at the second end.

In a fourth aspect A4 according to any preceding aspect, the tiltable stage has a maximum tilt angle of less than 15 degrees.

In a fifth aspect A5 according to any preceding aspect, the tiltable stage assembly further includes a hinge coupled between the base and the tiltable stage and a torsion spring coupled to the hinge. The torsion spring is configured to bias the tiltable stage to the initial position.

In a sixth aspect A6 according to any preceding aspect, the tiltable stage assembly further includes a roller bearing assembly coupled to the tiltable stage and to the base. The roller bearing assembly defines an axis of rotation of the tiltable stage.

In a seventh aspect A7 according to the sixth aspect A6, the roller bearing assembly is positioned beneath the tiltable stage.

In an eighth aspect A8 according to any preceding aspect, the tiltable stage assembly further includes a detent, wherein the detent is configured to prevent motion of the tiltable stage until a predetermined threshold force is exceeded.

In a ninth aspect A9 according to any preceding aspect, the tiltable stage assembly further includes a first spring and a second spring. The tiltable stage is movable in a first direction and in a second direction opposite the first direction. The first spring is compressed when the tiltable stage is moved in the first direction and the second spring is compressed when the tiltable stage is moved in the second direction.

In a tenth aspect A10 according to any preceding aspect, the tiltable stage assembly further includes an intermediate frame, a first roller bearing assembly, and a second roller bearing assembly. The intermediate frame is disposed between the base and the tiltable stage. The first roller bearing assembly is coupled to the base and to the intermediate frame. The second roller bearing assembly is coupled to the intermediate frame and to the tiltable stage. The first roller bearing assembly defines a first axis of rotation of the tiltable stage, and the second roller bearing assembly defines a second axis of rotation of the tiltable stage, thereby providing the tiltable stage with at least two degrees of freedom.

In an eleventh aspect A11 according to the tenth aspect A10, the second axis of rotation is positioned approximately 90 degrees to the first axis of rotation when the tiltable stage is in the initial position.

In a twelfth aspect A12 according to any preceding aspect, the tiltable stage assembly further includes a motor operable to move the tiltable stage from the initial position to the tilted position.

In a thirteenth aspect A13 according to the twelfth aspect A12, the motor is disposed beneath the tiltable stage and is coupled to the tiltable stage via a linkage mechanism.

In a fourteenth aspect A14 according to any preceding aspect, the tiltable stage assembly further includes a second tiltable stage operably coupled to the base and positioned beneath the base.

In a fifteenth aspect A15 according to any preceding aspect, the tiltable stage includes a retention device disposed on a top surface of the tiltable stage.

In a sixteenth aspect A16, a system includes a tiltable stage assembly and a robotic arm. The tiltable stage assembly includes a base and a tiltable stage operably coupled to the base and pivotable relative to the base. The tiltable stage is moveable between an initial position and a tilted position, wherein the tiltable stage is parallel with the base in the initial position and is oriented at an angle to the base when in the tilted position. The tiltable stage is biased to the initial position. The robotic arm is positioned within reach of the tiltable stage and is configured to exert a downward force on the tiltable stage, thereby moving the tiltable stage from the initial position to the tilted position.

In a seventeenth aspect A17 according to the sixteenth aspect A16, the tiltable stage assembly further includes a hinge coupled between the base and the tiltable stage and a torsion spring coupled to the hinge. The torsion spring is configured to bias the tiltable stage to the initial position.

In an eighteenth aspect A18 according to the sixteenth aspect A16 or the seventeenth aspect A17, the tiltable stage assembly further includes a roller bearing assembly coupled to the tiltable stage and to the base. The roller bearing assembly defines an axis of rotation of the tiltable stage.

In a nineteenth aspect A19 a tiltable stage assembly includes a base, a tiltable stage, and a motor. The tiltable stage is operably coupled to the base and pivotable relative to the base. The tiltable stage is moveable between an initial position and a tilted position, wherein the tiltable stage is parallel with the base in the initial position and is oriented at an angle to the base when in the tilted position. The tiltable stage is biased to the initial position. The motor is operably coupled to the tiltable stage and is configured to move the tiltable stage from the initial position to the tilted position.

In a twentieth aspect A20 according to the nineteenth aspect A19, the tiltable stage assembly further includes a second tiltable stage operably coupled to the base.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Figure 1:
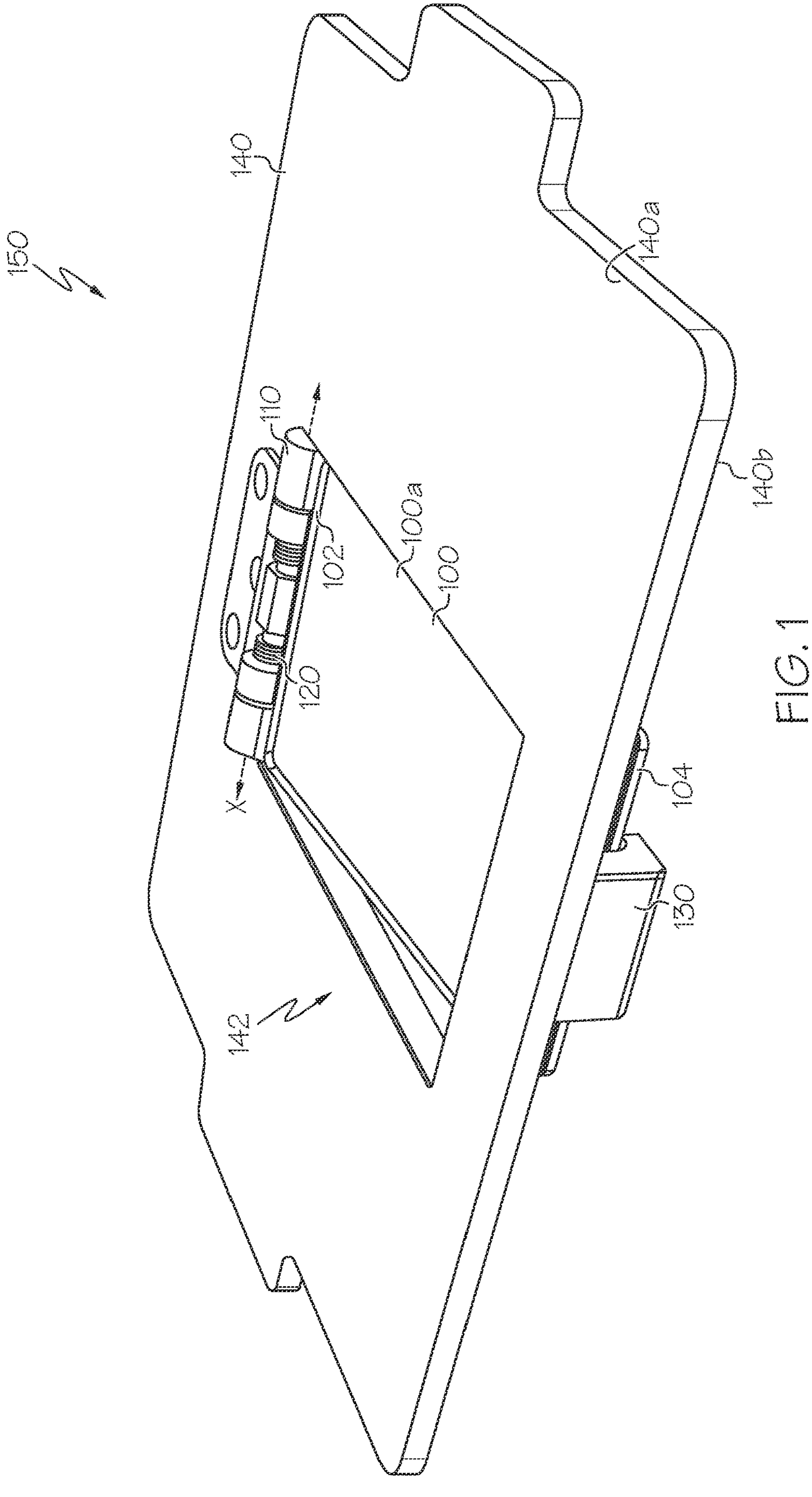
FIG. 1 schematically depicts a top perspective view of a tiltable stage assembly, according to one or more embodiments shown and described herein.

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Reference will now be made in detail to various embodiments of devices, assemblies, and methods, examples of which are illustrated in the accompanying drawings. Whenever possible, the same reference numerals will be used throughout the drawings to refer to the same or like parts. The present disclosure generally relates to a tiltable stage assembly that includes a base and a tiltable stage operably coupled to the base and pivotable relative to the base. The tiltable stage is moveable between an initial position and a tilted position, wherein the tiltable stage is parallel with the base in the initial position and is oriented at an angle to the base when in the tilted position. The tiltable stage is biased to the initial position. The tiltable stage may be moved from the initial position to the tilted position by a downward force acting upon the tiltable stage or by a motor acting on the tiltable stage. In this way, the tiltable stage may be move tom the initial position to the tilted position, thereby tilting an object upon the tiltable stage, without unnecessary interruption or human intervention. Accordingly, the tiltable stage may allow an object upon the stage to tilt. For example, the tiltable stage may tilt a well plate atop the tiltable stage. In such an embodiment, a liquid disposed within wells of the well plate may collect on sides of the wells, allowing better access to the liquid by a pipette, tool, robotic arm, or other interface. Accordingly, such benefits of tilting may be provided without human intervention or other interruption.

Directional terms as used herein—for example up, down, right, left, front, back, top, bottom—are made only with reference to the figures as drawn and are not intended to imply absolute orientation unless otherwise specified.

As used herein, the term "stages" refers generally to stages, printbeds, workstations, platen, and the like. As one non-limiting example, a stage may be a printbed for use in bioprinting or bioassembly application. As another non-limiting example, a stage may be a workstation surface configured to hold a well plate for sample testing.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

Figure 2:
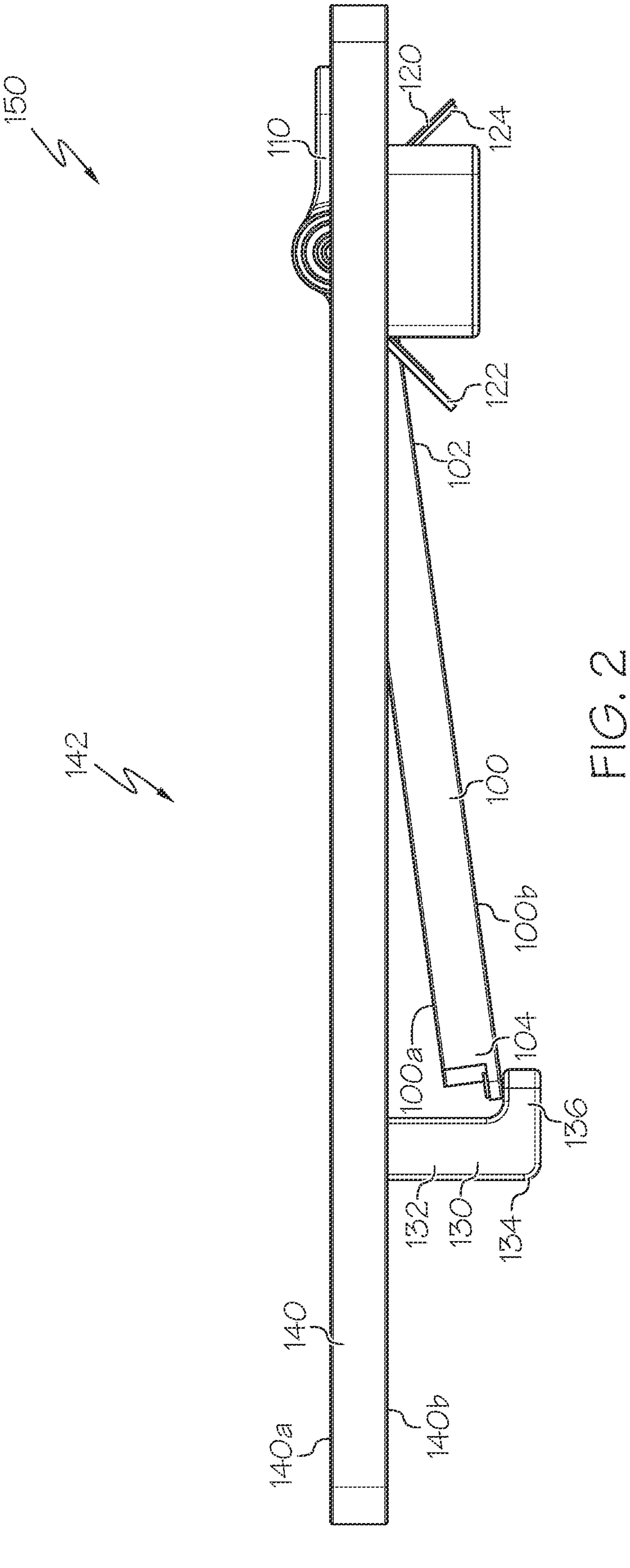
FIG. 2 schematically depicts a side view of the tiltable stage assembly of FIG. 1, according to one or more embodiments shown and described herein.

Referring collectively to FIGS. 1 and 2, a tiltable stage assembly 150 is schematically depicted. As shown, the tiltable stage assembly 150 may include a tiltable stage 100 coupled to a base 140. As shown the base 140 may include a top surface 140*a* and a bottom surface 140*b* opposite the top surface 140*a*. The base 140 may define an aperture 142 extending from the top surface 140*a* to the bottom surface 140*b* thereby creating a passage through the base 140. The tiltable stage 100 may be disposed within the aperture 142 of the base 140.

As depicted, the tiltable stage 100 may be substantially rectangular; however, other shapes are contemplated and possible. The tiltable stage may include a top surface 100*a* and a bottom surface 100*b* opposite the top surface 100*a*. The top surface 100*a* may be configured as a printbed or other worksurface. In some embodiments, the top surface 100*a* may be configured to receive a well plate (not depicted). For example, the top surface 100*a* may include clamps, recesses, or other retention devices for a well plate or other object.

The tiltable stage 100 may be rotatably coupled to the base 140. In particular, in some embodiments, the tiltable stage 100 may include a hinge 110. In some embodiments, the hinge 110 may include a roller bearing, ball bearing, or other friction-reducing component. The hinge 110 may be coupled to the tiltable stage 100 at a first end 102 of the tiltable stage 100. The hinge 110 may additionally be coupled to the base 140. Accordingly, the tiltable stage 100 may be rotatably coupled to the base 140 via the hinge 110. The hinge 110 may define an axis of rotation X about which the tiltable stage 100 may rotate. In particular, the tiltable stage 100 may rotate about the axis of rotation X such that it pivots from an initial position to a tilted position in the rotation direction, θ. In the initial position, the top surface 100*a* of the tiltable stage 100 may be aligned with the top surface 140*a* of the base 140. In other words, the tiltable stage 100 may be parallel with the base 140. In the titled position, the top surface 100*a* of the tiltable stage 100 may be oriented at an angle to the top surface 140*a* of the base 140. As depicted in particular in FIG. 1, in the titled position, a second end 104 of the tiltable stage 100 may be lowered relative to the first end 102. Accordingly, the second end 104 may be lower than the base 140 when in the titled position.

Referring still to FIGS. 1 and 2 in combination, the tiltable stage 100 may be biased toward the initial position. In particular, the tiltable stage 100 maybe spring loaded toward the initial position. For example, the tiltable stage 100 may include a torsion spring 120 coupled to the tiltable stage 100. As shown in FIG. 2, the torsion spring 120 may extend between a first end 122 and a second end 124. The first end 122 may be positioned beneath the tiltable stage 100, and the second end 124 may be positioned beneath the base 140. The first end 122 and the second end 124 may each be unconstrained, such as shown. However, in other embodiments, the first end 122 may be coupled to the tiltable stage 100 via adhesive, weld, or other suitable method. In a similar manner, in some embodiments, the second end 124 may be coupled to the base 140. As depicted, the torsion spring 120 may wrap about the hinge 110; however, other orientations are contemplated and possible. For example, the torsion spring 120 may be positioned beneath the hinge 110. As will now be appreciated, upon rotation of the tiltable stage 100 from the initial position to the tilted position, the torsion spring 120 may exert a spring force upon the tiltable stage 100. Accordingly, the tiltable stage 100 may be spring loaded toward the initial position. For example, in the initial position, the top surface 140*a* of the base 140 may be substantially flush with the top surface 100*a* of the tiltable stage 100, though other initial positions are contemplated and possible.

Still referring to FIG. 2, the tiltable stage assembly 150 may include a stage stop 130. The stage stop 130 may include an upper end 132 and a lower end 134 beneath the upper end 132 so as to be positioned further from the base 140 than the upper end 132. The stage stop 130 may include a lip 136 extending from the lower end 134. The upper end 132 of the stage stop 130 may be coupled to the base 140 near the aperture 142, such as depicted. In particular, the stage stop 130 may extend downward from the base 140 such that the lower end 134 and the lip 136 are oriented beneath the base 140. Accordingly, as the tiltable stage 100 rotates from the initial position to the tilted position, the second end 104 of the tiltable stage 100 may contact the lip 136 of the stage stop 130. In this way, the stage stop 130 may prevent additional rotation of the tiltable stage 100 and may therefore define a maximum tilt angle of the tiltable stage 100. This may be beneficial in some embodiments as it may prevent over-rotation of the tiltable stage 100. In some embodiments, the maximum tilt angle may be less than about 20 degrees, less than about 15 degrees, less than about 10 degrees, or less than about 5 degrees, though other maximum tilt angles are contemplated and possible.

As will be appreciated by those skilled in the art, in other embodiments, the stage stop 130 may not be coupled to the base 140 and may, instead, be coupled to the tiltable stage 100. In such an embodiment, the lip 136 of the stage stop 130 may be coupled to the upper end 132 of the stage stop 130 such that it contacts the top surface 140*a* of the base 140 when rotated to a maximum tilt angle rotation of the tiltable stage 100.

Figure 6:
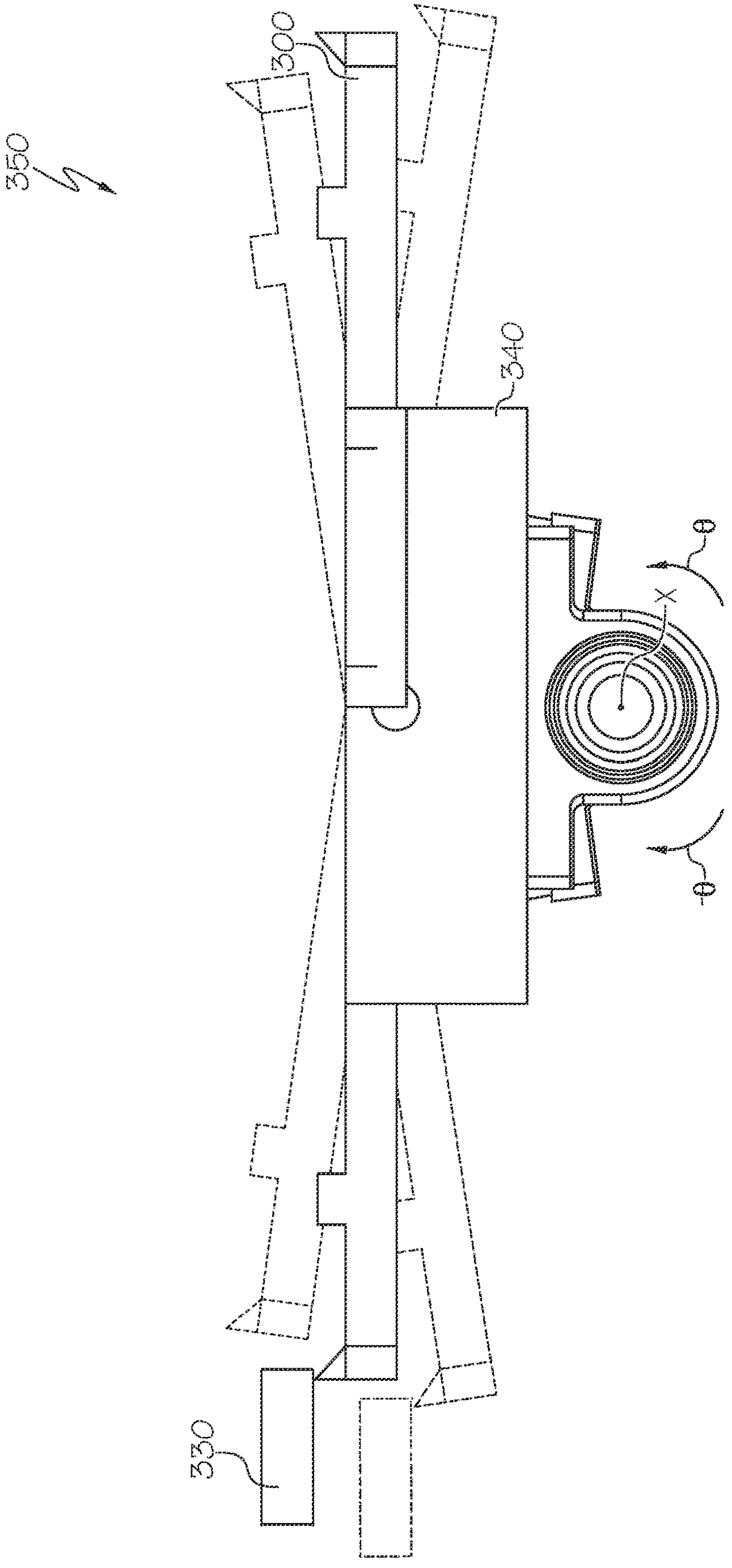
FIG. 6 schematically depicts a side view of the tiltable stage assembly of FIGS. 4A and 4B, according to one or more embodiments shown and described herein.

In light of FIGS. 1 and 2, it will be appreciated that the tiltable stage 100 may be moved from the initial position to the tilted position by imparting a downward force on the second end 104 of the tiltable stage 100. In some embodiments, this force may be exerted by a robotic arm (e.g., the robotic arm 330 depicted in FIG. 6) positioned within reach of the tiltable stage 100. For example, the tiltable stage assembly 150 may be included within a larger system, such as an automated biological staining and image analysis system. In such embodiments, the larger system into which the tiltable stage assembly 150 is incorporated may include a material holding apparatus, such as a well plate, disposed on the tiltable stage 100. The larger system may also include a robotic arm positioned within reach of the material holding apparatus and the tiltable stage 100. Accordingly, in such a system, the robotic arm may be operable to effect a material within the material holding apparatus such as may be required for material testing or other procedure. Similarly, the robotic arm may be able to exert a force on the tiltable stage 100 such that the tiltable stage 100 may move from the initial position to the tilted position. In this way, the well plate disposed on the tiltable stage 100 may be tilted without unnecessary interruption or direct human interaction.

Figure 3:
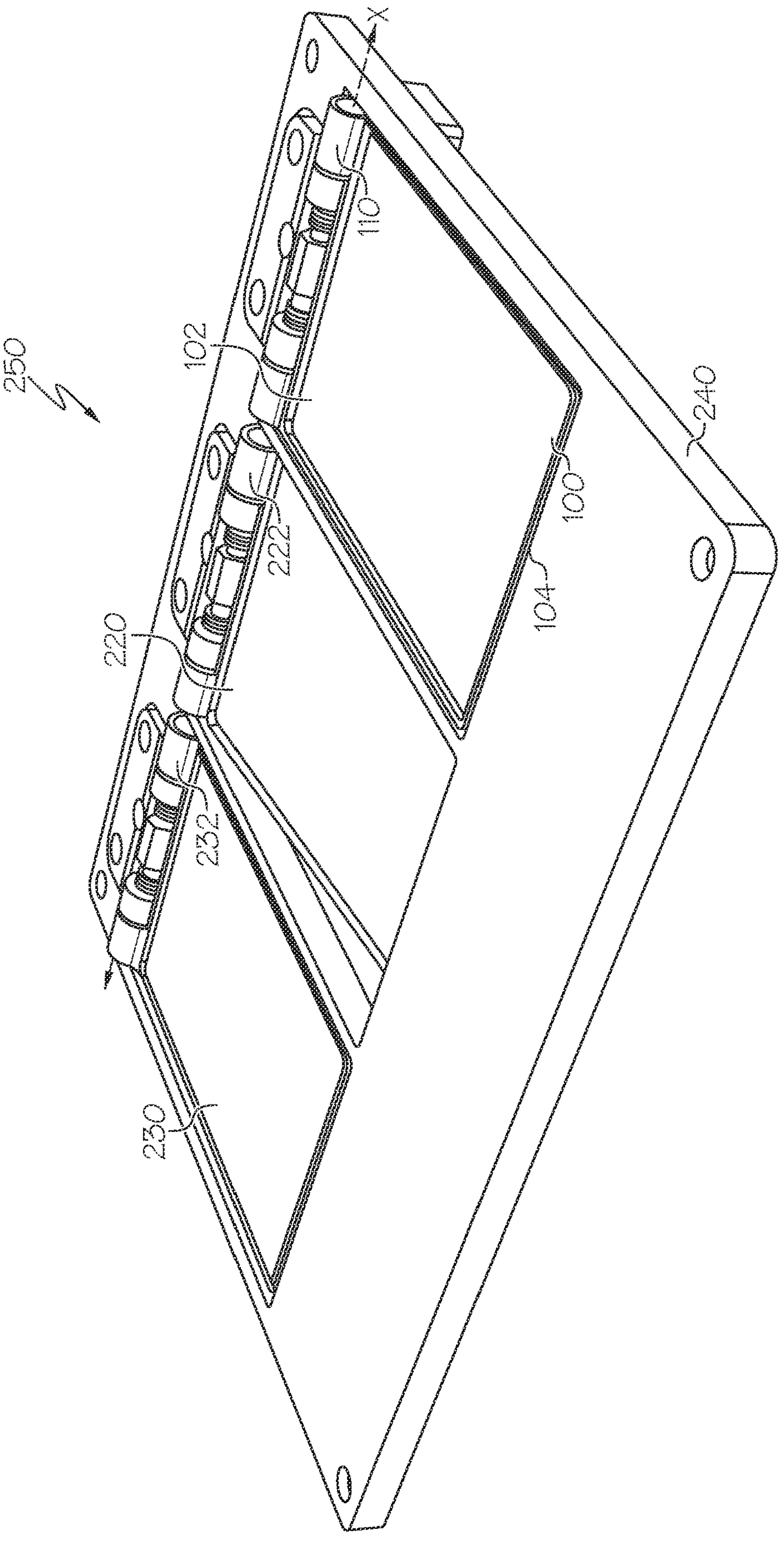
FIG. 3 schematically depicts a top perspective view of another tiltable stage assembly, according to one or more embodiments shown and described herein.

Referring now to FIG. 3, an embodiment of a tiltable stage assembly 250 is schematically depicted. The tiltable stage assembly 250 is substantially similar to the tiltable stage assembly 150. Accordingly, like numbers will be used for like features. For example, the tiltable stage assembly 250 may include the tiltable stage 100 operably coupled to a base 240.

As depicted, the tiltable stage assembly 250 may include one or more additional tiltable stages, such as a second tiltable stage 220 and a third tiltable stage 230. It is noted that while the tiltable stage assemble 250 is depicted as having three total tiltable stages (i.e., the tiltable stage 100, the second tiltable stage 220 and the third tiltable stage 230), a greater or fewer number of tiltable stages is contemplated and possible. The second tiltable stage 220 and the third tiltable stage 230 may be operably coupled to the base 240 in a similar manner as the tiltable stage 100. For example, the second tiltable stage 220 may be coupled to the base 240 via a second hinge 222, and the third tiltable stage 230 may be coupled to the base 240 via a third hinge 232. The second hinge 222 and the third hinge 232 may be substantially similar to the hinge 110. As depicted, the hinge 110, the second hinge 222, and the third hinge 232 may substantially aligned along the axis of rotation X. However, in other embodiments, the hinge 110, the second hinge 222, and the third hinge 232 may not be aligned. For example, the second tiltable stage 220 and the second hinge 222 may be aligned with the second end 104 of the tiltable stage 100 as opposed to the first end 102.

Figure 4A:
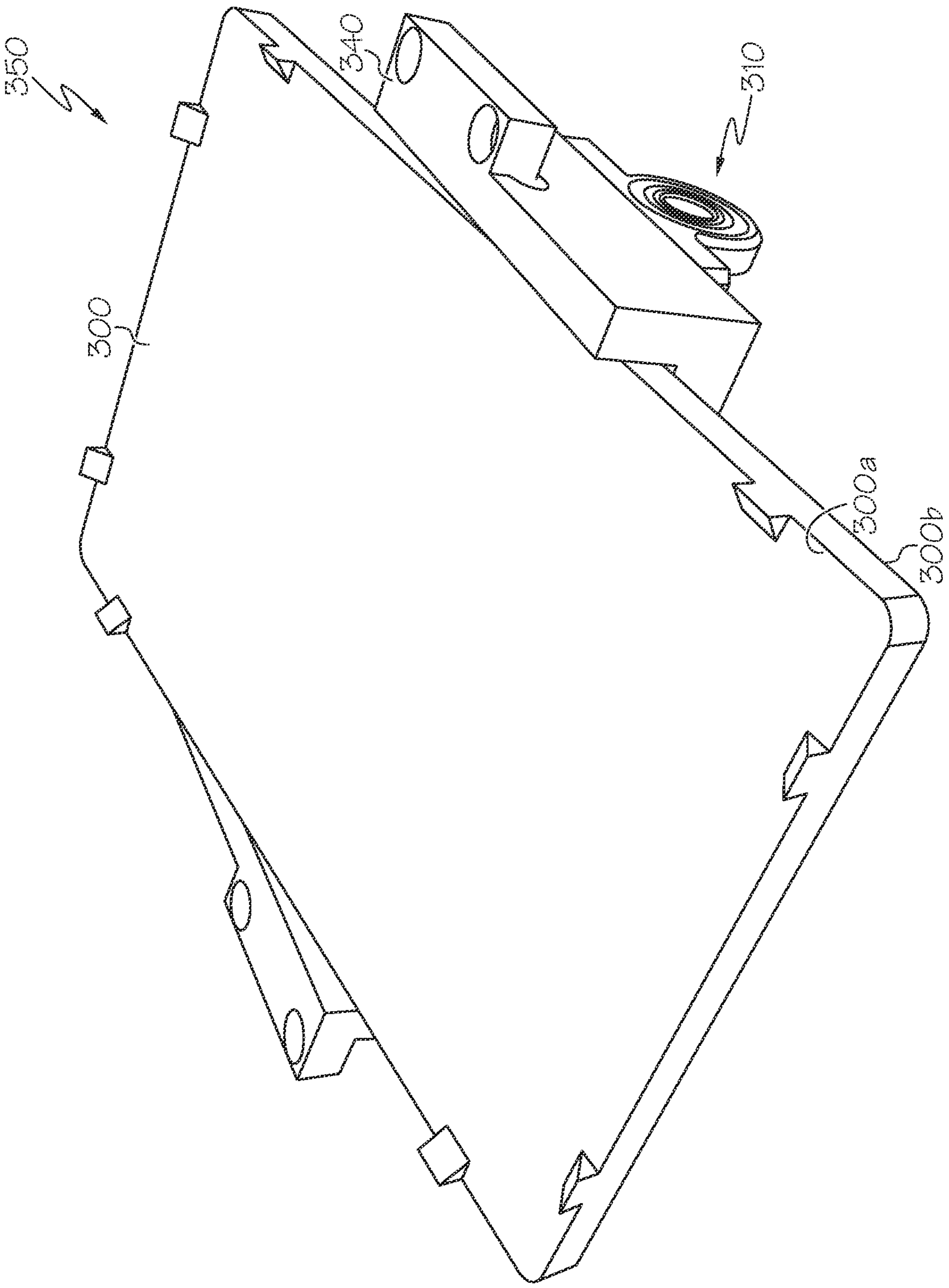
FIG. 4A schematically depict a top perspective view of another tiltable stage assembly, according to one or more embodiments shown and described herein.
Figure 4B:
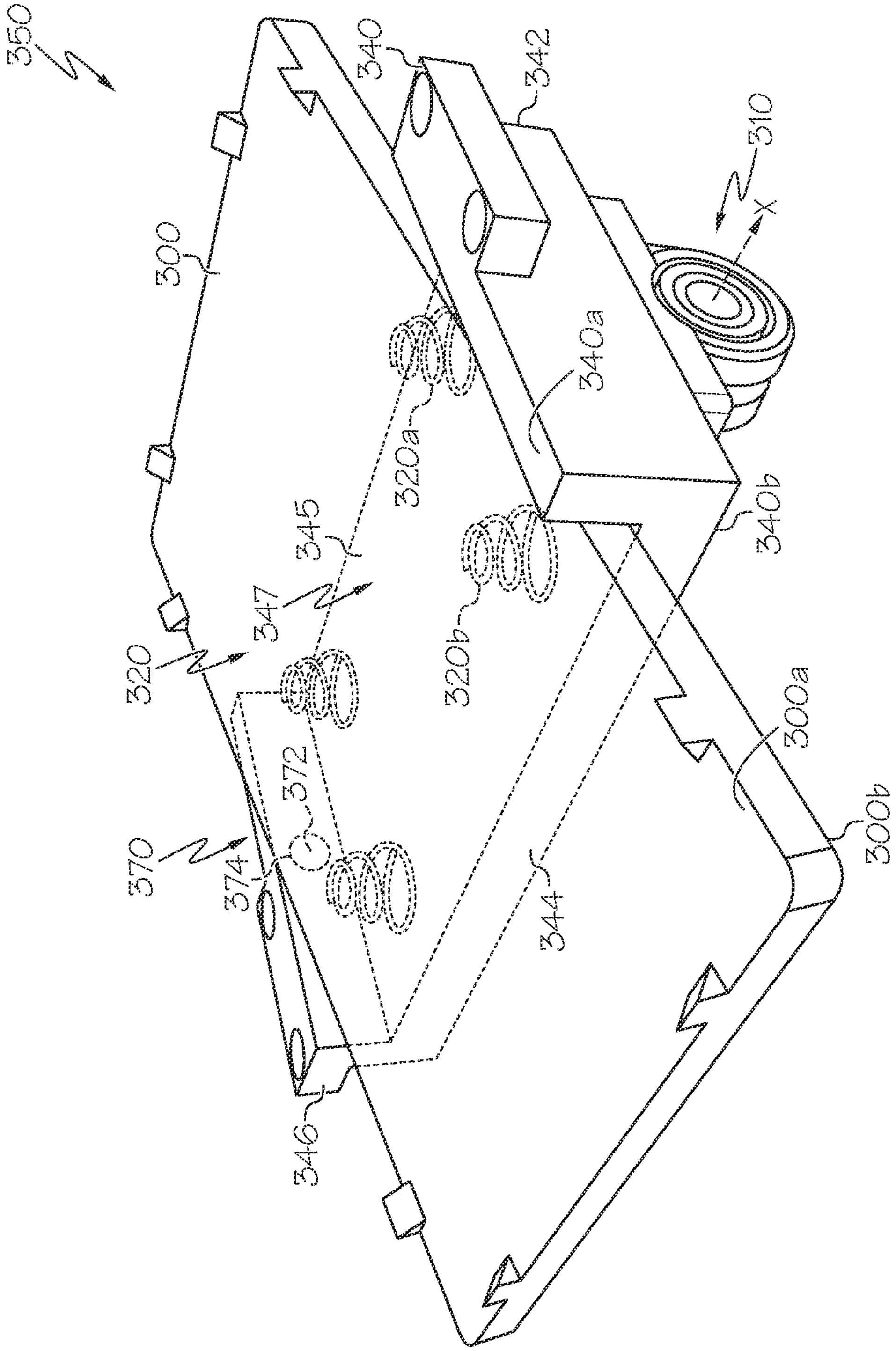
FIG. 4B schematically illustrates a spring of the tiltable stage assembly of FIG. 4A, according to one or more embodiments shown and described here.

Referring now to FIGS. 4A and 4B in combination, an embodiment of a tiltable stage assembly 350 is schematically depicted. The tiltable stage assembly 350 is substantially similar to the tiltable stage assemblies 150 and 250. Accordingly, like numbers will be used to like features. For example, the tiltable stage assembly 350 may include a tiltable stage 300 operably coupled to a base 340 such that the tiltable stage 300 is moveable between an initial position and a tilted position. The tiltable stage 300 may define a top surface 300*a* and a bottom surface 300*b*, and the base 340 may similarly define a top surface 340*a* and a bottom surface 340*b*.

Figure 5:
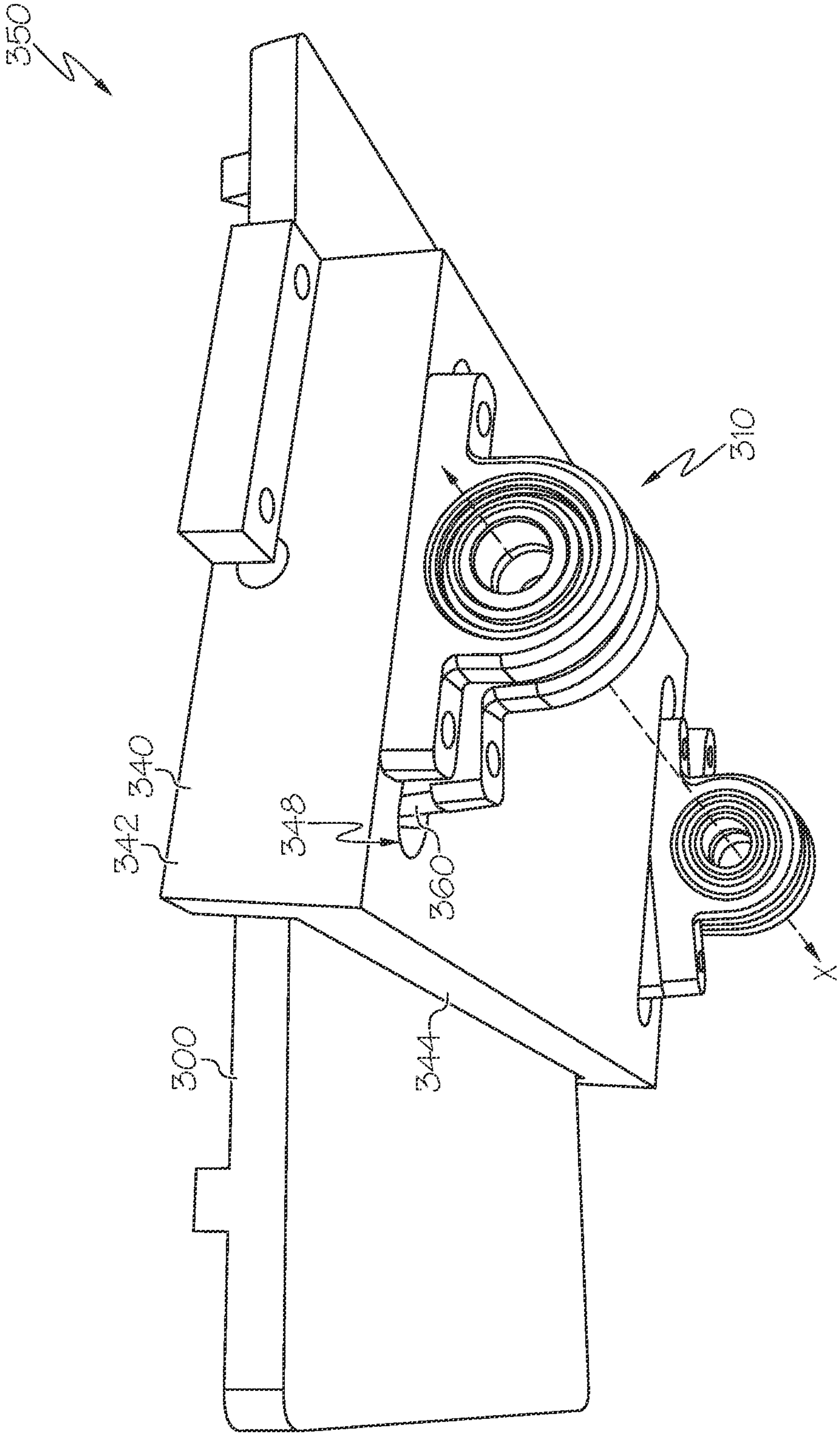
FIG. 5 schematically depicts a bottom perspective view of the tiltable stage assembly of FIGS. 4A and 4B, according to one or more embodiments shown and described herein.

As shown, the base 340 may have a center portion 344 positioned between a first side portion 342 and a second side portion 346. The center portion 344, the first side portion 342, and the second side portion 344 may together define a cradle 347 or recessed region configured to receive the tiltable stage therein. Stated another way, the center portion may be positioned lower or recessed relative to the top surface 340*a* thereby defining the cradle 347. As depicted, the tiltable stage 300 may fit above the center portion 344 within the cradle 347. In particular, a top surface 345 of the center portion 344 may extend beneath the tiltable stage 300. Contrastingly, the top surface 340*a* of the base 340 at the first side portion 342 and the second side portion 346 may be substantially level with the top surface 300*a* of the tiltable stage 300 when oriented in the initial (e.g., non-tilted) position. In embodiments, and as depicted in FIG. 5, the base 340 may define one or more standoff apertures 348 extending through the center portion 344. As will be described in greater detail herein, the one or more standoff apertures 348 may be sized and positioned to receive one or more standoffs 360 extending therethrough.

As stated hereinabove, the tiltable stage 300 may be operably coupled to the base 340, the tiltable stage 300 may be rotatably coupled to the base 340 via a roller bearing assembly 310 or other appropriate rotational joint. The roller bearing assembly 310 may define an axis of rotation X and a rotational direction θ such as depicted. In embodiments, the roller bearing assembly 310 may include a pin (not pictured) extending through the roller bearing assembly 310 along the axis of rotation X.

As depicted particularly in FIG. 5, the tiltable stage 300 may include one or more standoffs 360 extending downward from the bottom surface 300*a*. The one or more standoffs 360 may extend through the one or more standoff apertures 348. The roller bearing assembly 310 may be coupled to the one or more standoffs 360 such that the roller bearing assembly 310 is positioned beneath the tiltable stage 300. The roller bearing assembly 310 may be coupled to the bottom surface 340*b* of the base 340 such that the roller bearing assembly 310 is positioned beneath the base 340. Accordingly, the roller bearing assembly 310 may be beneath both the base 340 and the tiltable stage 300. In this way, the roller bearing assembly 310 may be separated from the top surface 300*a* of the tiltable stage 300, which may be a work surface. By coupling the one or more standoffs 360 to the roller bearing assembly 310, the tiltable stage may be rotatably coupled to the base 340. Moreover, the one or more standoffs 360 may elevate or suspend the tiltable stage 300 above the base 340 such that the bottom surface 300*b* of the tiltable stage 300 does not contact the center portion 344 when in the initial (or non-tilted) position.

Referring back to FIGS. 4A and 4B in combination, the tiltable stage assembly 350 may include one or more springs 320. In particular, the tiltable stage assembly 350 may include four springs, such as depicted; however, a greater or fewer number of springs is contemplated and possible. The one or more springs 320 may be coupled between the base 340 and the tiltable stage 300. More specifically, in some embodiments, the one or more springs 320 may extend between the top surface 345 of the center portion 344 of the base 340 and the bottom surface 300*b* of the tiltable stage 300*b*. The one or more springs 320 may be positioned at a distance from the axis of rotation X, such as depicted. In this way, the one or more springs 320 may bias the tiltable stage 300 toward the initial position. The one or more springs 320 may be positioned such that a first spring 320*a* is on a first side of the axis of rotation X, and a second spring 320*b* is on a second side of the axis of rotation X, such as depicted. However, other orientations are contemplated and possible. There may be any number of springs 320 such as two or more springs, three or more springs, four or more springs, or the like.

Referring particularly to FIG. 4B, the tiltable stage assembly 350 may include a detent 370 which may prevent movement of the tiltable stage 300 relative to the base 340 until the tiltable stage 300 is acted upon by a predetermined threshold force. The detent 370 may include a protrusion 372 extending from the tiltable stage 300 and may include a depression 374 indented into the first side portion 342 and/or the second side portion 346. The protrusion 372 and the depression 374 may be sized such that the protrusion 372 fits within the depression 374. The protrusion 372 and the depression 374 may be sized such that the protrusion 372 may be moved into and out of engagement with the depression 374 when acted upon by the predetermined threshold force. The detent 370 may be positioned at a distance from the axis of rotation X. In this way, the detent 370 may prevent movement of the tiltable stage 300 relative to the base 340 until the tiltable stage 300 is acted upon by the predetermined threshold force In light of FIGS. 4A and 4B in combination with FIG. 6, it will now be appreciated that the tiltable stage 300 may be moveable between an initial position and a tilted position about the axis of rotation X. In some embodiments, the tiltable stage 300 may be moveable between an initial position (e.g., non-tilted or horizontal) and two or more tilted positions (e.g. in the tilted positions depicted in phantom in FIG. 6). In particular, the tiltable stage 300 may be moveable in a first rotation direction (e.g., in the +θ direction as depicted) and a second direction opposite the first direction (e.g., in the −θ direction as depicted) about the axis of rotation X. As described with reference to the tiltable stage 100, the tiltable stage 300 may be moved from the initial position to the tilted position when acted upon by a downward force. For example, the tiltable stage 300 may be moved from the initial position to the tilted position when acted upon by a robotic arm 330, such as depicted. The tiltable stage 300 may be biased to the initial position and, accordingly, may return to the initial position when not acted upon by a downward force. In particular, the tiltable stage 300 may be biased to the initial position by the one or more springs 320. In embodiments having at least the first spring 320*a* and the second spring 320*b*, the first spring 320*a* may be compressed when the tiltable stage 300 is moved in the first direction (e.g., in the +θ direction as depicted) and the second spring 320*b* may be compressed when the tiltable stage 300 is moved in the second direction (e.g., in the −θ direction as depicted). Accordingly, the first spring 320*a* and the second spring 320*b* may exert forces on the tiltable stage 300 when the tiltable stage 300 is moved and may bias the tiltable stage 300 toward the initial position.

Figure 7:
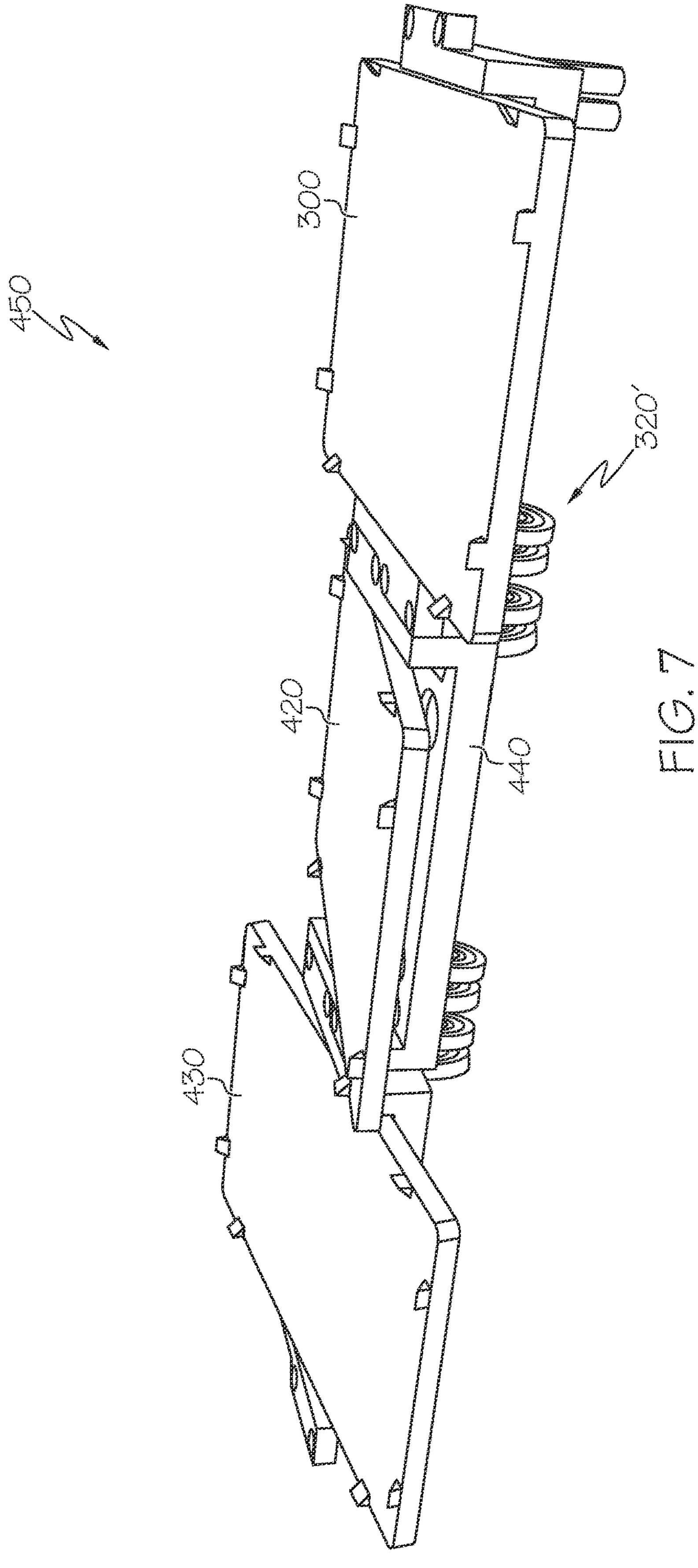
FIG. 7 schematically depicts a side perspective view of another tiltable stage assembly, according to one or more embodiments shown and described herein.

Referring now to FIG. 7, an embodiment of a tiltable stage assembly 450 is schematically depicted. The tiltable stage assembly 450 is substantially similar to the tiltable stage assemblies 150, 250, and 350. Accordingly, like numbers will be used for like features. For example, the tiltable stage assembly 450 may include the tiltable stage 300 operably coupled to a base 440.

As depicted, the tiltable stage assembly 450 may include one or more additional tiltable stages, such as a second tiltable stage 420 and a third tiltable stage 430. It is noted that while the tiltable stage assembly 450 is depicted as having three total tiltable stages (i.e., the tiltable stage 300, the second tiltable stage 420 and the third tiltable stage 430), a greater or fewer number of tiltable stages is contemplated and possible. The second tiltable stage 420 and the third tiltable stage 430 may be operably coupled to the base 440 in a similar manner as the tiltable stage 300. For example, the second tiltable stage 420 and the third tiltable stage 430 may each have standoffs connected to a roller bearing assembly 320' such as described with respect the tiltable stage 300 hereinabove. As depicted, the roller bearing assembly 320' may extend across the tiltable stage 300, the second tiltable stage 420, and the third tiltable stage 430. Accordingly, the tiltable stage 300, the second tiltable stage 420, and the third tiltable stage 430 may substantially aligned along the axis of rotation X and may each rotated about the axis of rotation X.

Figure 8:
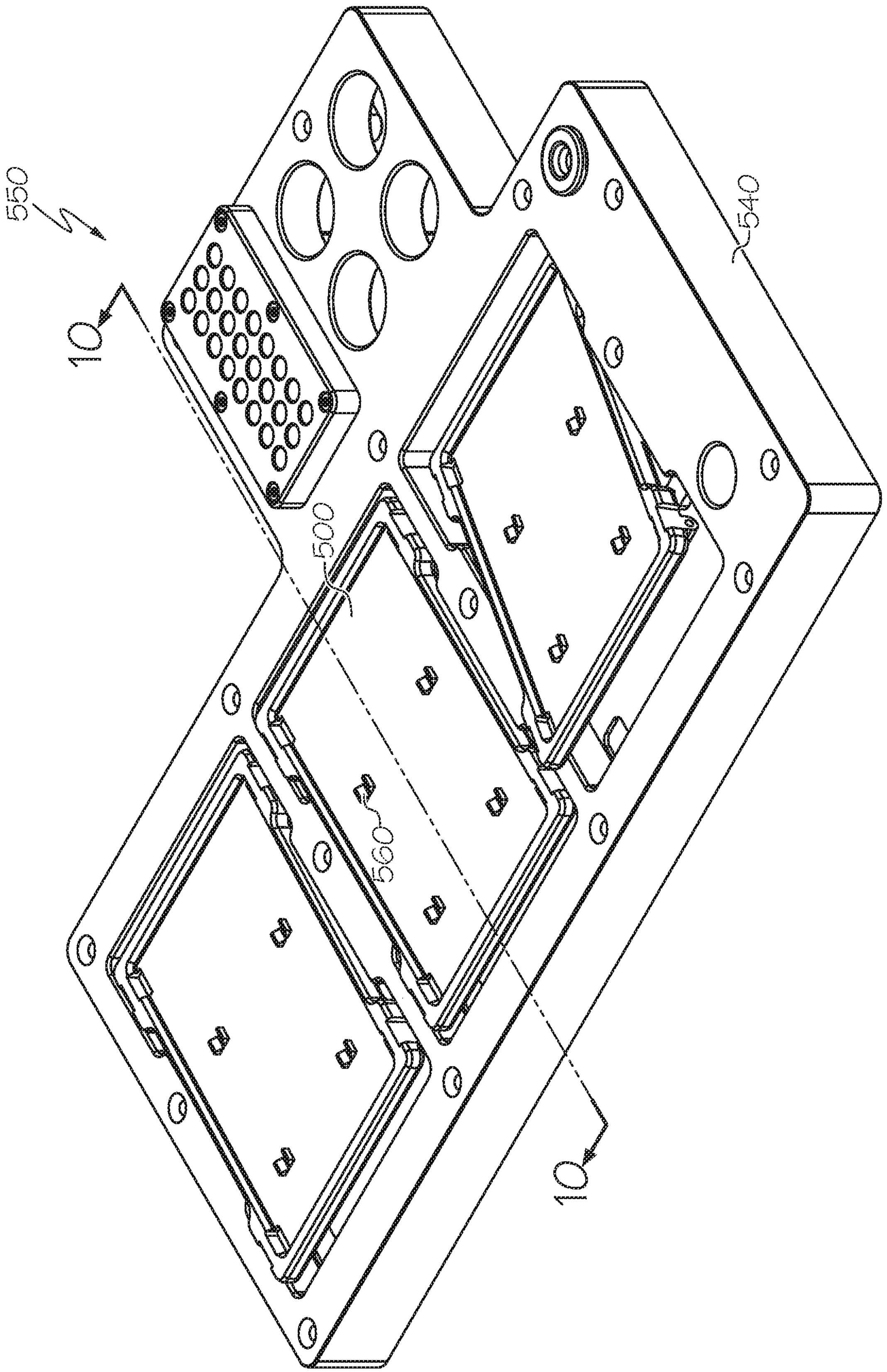
FIG. 8 schematically depicts a top perspective view of another tiltable stage assembly, according to one or more embodiments shown and described herein.
Figure 9:
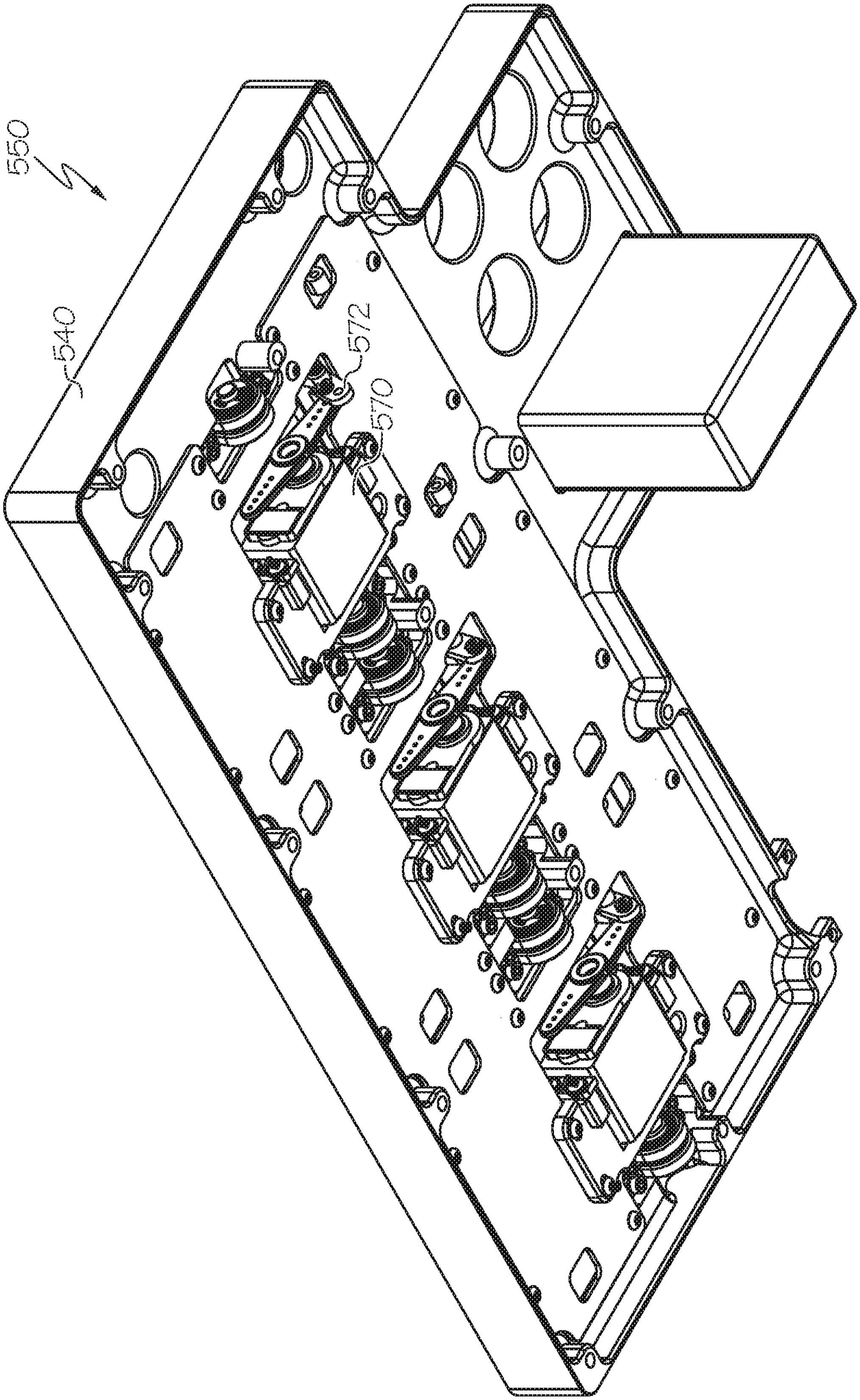
FIG. 9 schematically depicts a bottom perspective view of the tiltable stage assembly of FIG. 8, according to one or more embodiments shown and described herein.

Referring now to FIGS. 8 and 9, an embodiment of a tiltable stage assembly 550 is schematically depicted. The tiltable stage assembly 550 is substantially similar to the tiltable stage assemblies 150, 250, 350, and 450. Accordingly, like numbers will be used for like features. For example, the tiltable stage assembly 550 may include the tiltable stage 500 operably coupled to a base 540 via the roller bearing assembly 320'. As depicted, the tiltable stage assembly 550 may include additional tiltable stages operably coupled to the base 540. The tiltable stage 500 may include a standoff (not visible in FIGS. 8 and 9) that may extend through a standoff aperture of the base 540 such as described with reference to the tiltable stages assembly 450, above. The standoff may be coupled to the roller bearing assembly 320' such as described with reference to the with reference to the tiltable stages assembly 450, above.

As depicted particularly in FIG. 8, the tiltable stage 500 may include one or more retention devices 560. The retention devices 560 may be positioned on a top surface 500*a* of the tiltable stage 500 and may be configured to retain an item, such as a well plate, against the tiltable stage 500.

Figure 10:
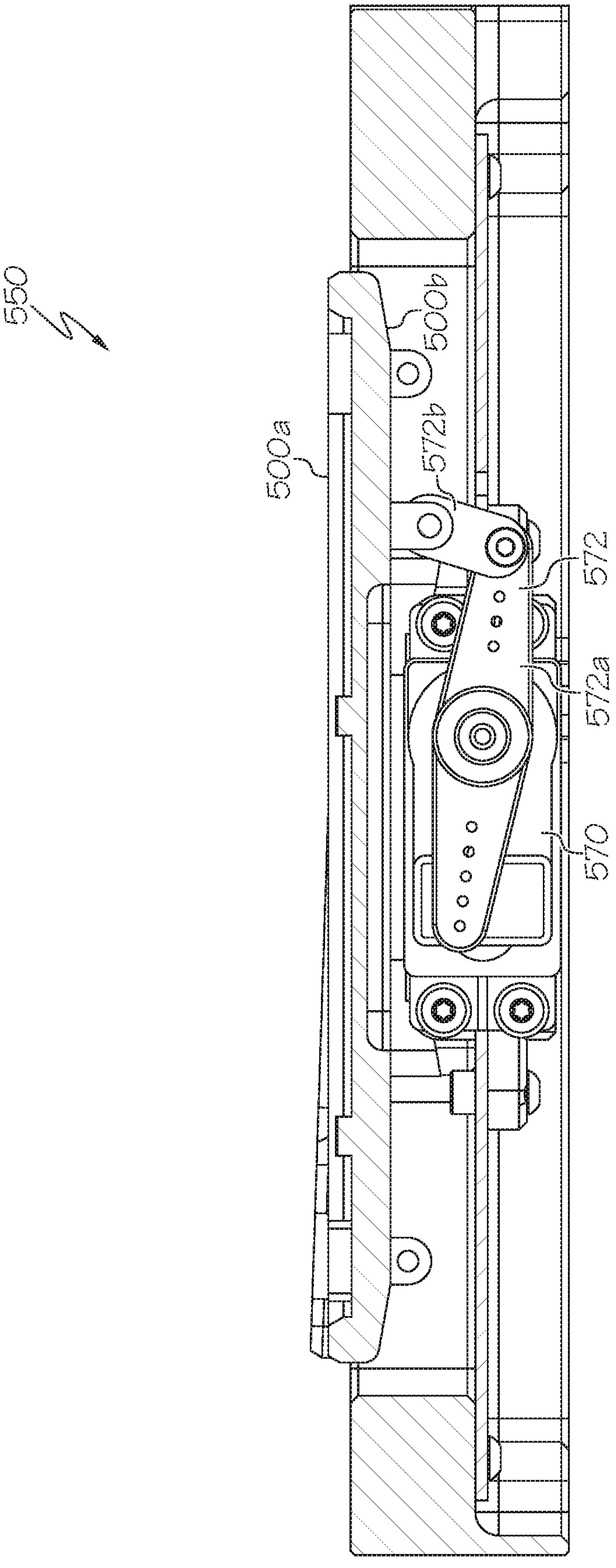
FIG. 10 schematically depicts a cross section of the tiltable stage assembly of FIG. 8 taken along Plane 10-10, according to one or more embodiments shown and described herein.

Referring now to FIGS. 9 and 10 in combination, the tiltable stage 500 may be actuated such that it moves from an initial position to a tilted position about an axis of rotation X, defined by the roller bearing assembly 320'. In particular, the tiltable stage assembly 550 may include a motor 570. The motor 570 may be coupled to the base 540 such as depicted. Accordingly, the motor 570 may be disposed beneath the tiltable stage 500. The motor 570 may be coupled to a bottom surface 500*b* of the tiltable stage 500 with a linkage mechanism 572, such as depicted. As will be appreciated by those skilled in the art, the rotation of the motor 570 may cause a corresponding motion of the linkage mechanism 572, which may in turn cause a corresponding motion of the tiltable stage 500. In particular, the linkage mechanism 572 may include a first link 572*a* and a second link 572*b* such that, when considered with the movement of the tiltable stage 500, the linkage mechanism 572 and the tiltable stage 500 move as a standard four bar mechanism. In this way, a rotation of the motor 570 may cause the tiltable stage 500 to rotate about the roller bearing assembly 320'. Accordingly, in some embodiments, the tiltable stage 500 may move from the initial position to the tilted position without requiring an external force acting on the tiltable stage assembly 550.

Figure 11:
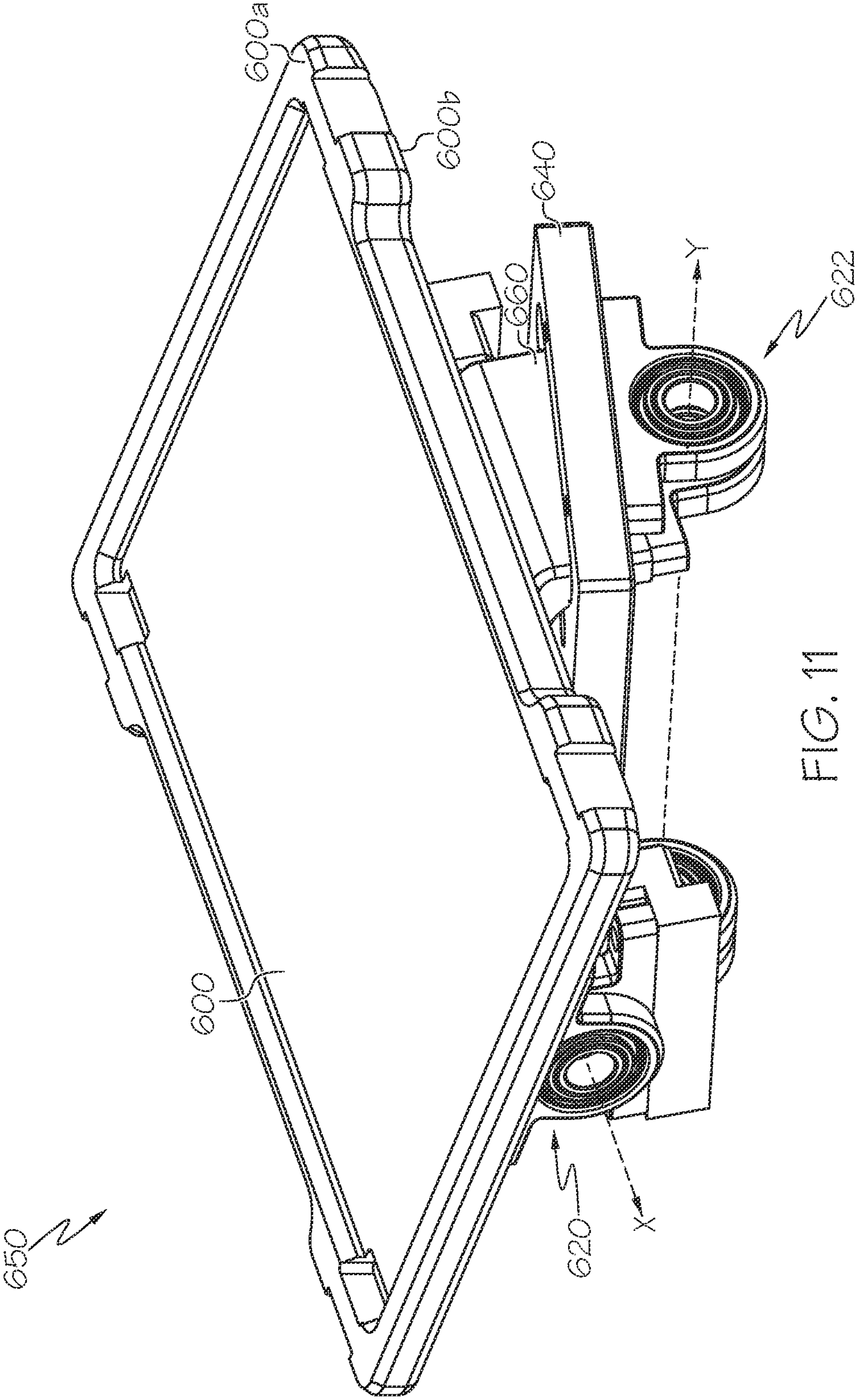
FIG. 11 schematically depicts a side perspective view of another tiltable stage assembly, according to one or more embodiments shown and described herein.
Figure 12:
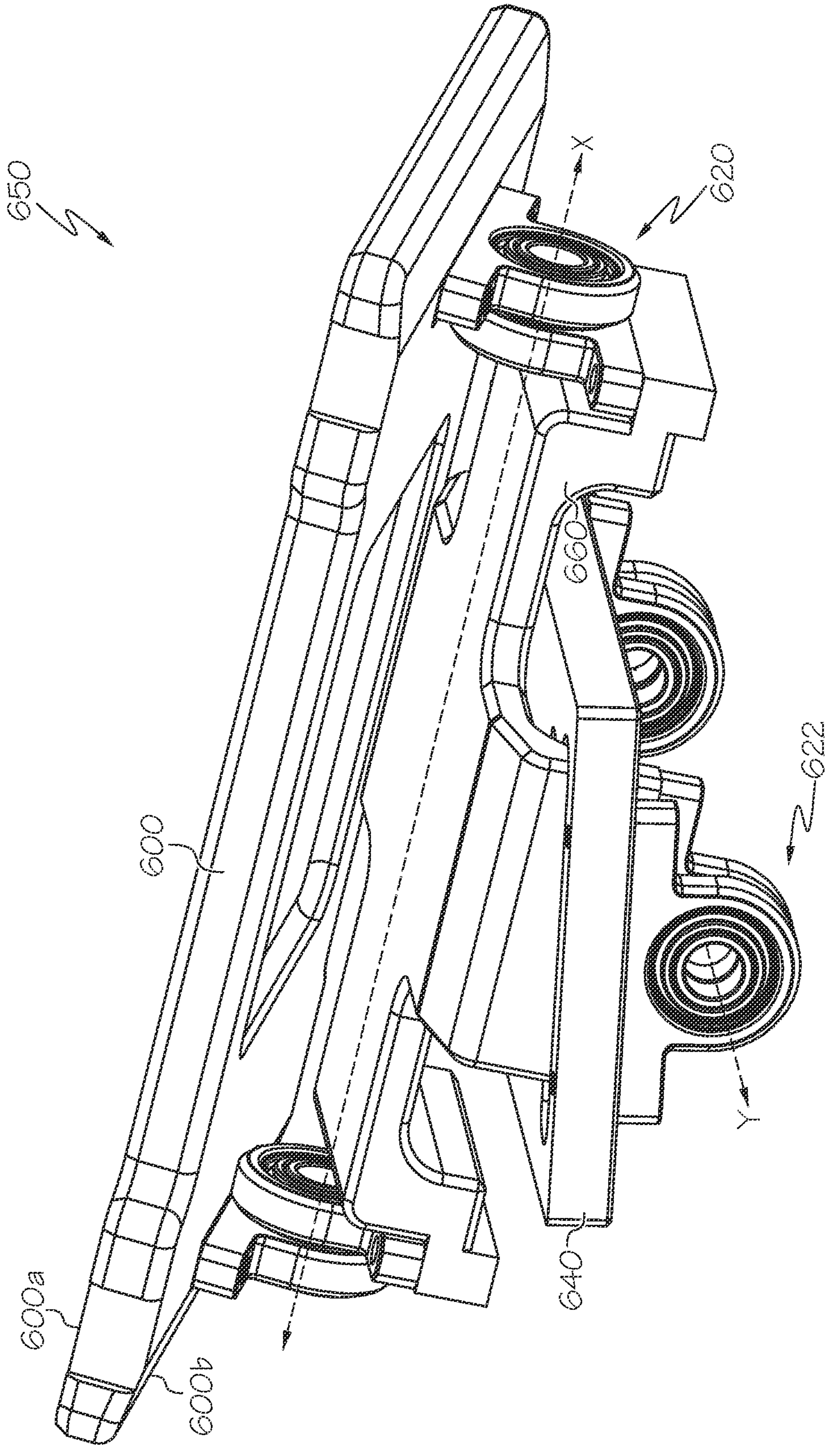
FIG. 12 schematically depicts another side perspective view of the tiltable stage assembly of FIG. 11, according to one or more embodiments shown and described herein.

Referring now to FIGS. 11 and 12, an embodiment of a tiltable stage assembly 650 is schematically depicted. The tiltable stage assembly 650 is substantially similar to the tiltable stage assemblies 150, 250, 350, 450, and 550. Accordingly, like numbers will be used to like features.

The tiltable stage assembly 650 may include a tiltable stage 600 operable coupled to a base 640. In particular, the tiltable stage 600 may be operably coupled to the base 640 via an intermediate frame 660. In other words, the tiltable stage 600 may be coupled to the intermediate frame 660 which may be coupled to the base 640. The intermediate frame 660 may be positioned above the base 640, and the tiltable stage 600 may be positioned above the intermediate frame 660, such as depicted. In this way, a top surface 600*a* of the tiltable stage 600 may remain accessible for use as a work surface or a support surface for a well plate or the like.

As depicted, the tiltable stage 600 may be coupled to the intermediate frame 660 via a first roller bearing assembly 620. Accordingly, the first rolled bearing assembly 620 may define a first axis of rotation X about which the tiltable stage 600 may rotated relative to the intermediate frame 660. The first roller bearing assembly 620 may be disposed beneath the tiltable stage 600. The intermediate frame 660 may be coupled to the base 640 via a second roller bearing assembly 622. Accordingly, the second roller bearing assembly 622 may define a second axis of rotation Y about which the intermediate frame 660 may rotated relative to the base 640. The second roller bearing assembly 622 may be disposed beneath the intermediate frame 660. As depicted, the intermediate frame 660 may have one or more standoffs that extend downward from the intermediate frame 660 and through one or more apertures of the base 640 as described with reference to the tiltable stage assembly 350 hereinabove.

Still referring to FIGS. 11 and 12, the first roller bearing assembly 620 and the second roller bearing 622 may be positioned and oriented such that the second axis of rotation Y may be oriented about 90 degrees relative to the first axis of rotation X when the tiltable stage 600 is in an initial position. As will be appreciated by those skilled in the art, the first axis of rotation X and the second axis of rotation Y may allow for the tiltable stage 600 to move with at least two degrees of freedom relative to the base 640. This may be beneficial in some embodiments as it may enable the tiltable stage 600 to be oriented in a greater number of positions.

Although not depicted in FIGS. 11 and 12 for clarity, it should be appreciated that the tiltable stage assembly 650 may include one or more motors and/or one or more springs such as described with references to the earlier embodiments.

In view of the above, it should now be understood that at least some embodiments of the present disclosure are directed to a tiltable stage assembly includes a base and a tiltable stage operably coupled to the base and pivotable relative to the base. The tiltable stage is moveable between an initial position and a tilted position, wherein the tiltable stage is parallel with the base in the initial position and is oriented at an angle to the base when in the tilted position. The tiltable stage is biased to the initial position. The tiltable stage may be moved from the initial position to the tilted position by a downward force acting upon the tiltable stage or by a motor acting on the tiltable stage. In this way, the tiltable stage may be move tom the initial position to the tilted position, thereby tilting an object upon the tiltable stage, without unnecessary interruption or human intervention.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tiltable stage assembly comprising:

a base;

a tiltable stage operably coupled to the base and pivotable relative to the base, wherein the tiltable stage is moveable between an initial position and a tilted position, wherein the tiltable stage is parallel with the base in the initial position and is oriented at an angle to the base when in the tilted position, wherein the tiltable stage is biased to the initial position; and a first spring and a second spring, wherein the tiltable stage is movable in a first direction and in a second direction opposite the first direction, wherein the first spring is compressed when the tiltable stage is moved in the first direction and the second spring is compressed when the tiltable stage is moved in the second direction.

2. The tiltable stage assembly of claim 1, further comprising a stage stop, wherein the stage stop is positioned to contact the tiltable stage when the tiltable stage is in the tilted position, thereby defining a maximum tilt angle of the tiltable stage.

3. The tiltable stage assembly of claim 2, wherein the stage stop extends between a first end and a second end, wherein the stage stop is coupled to the base at the first end and is configured to contact the tiltable stage at the second end.

4. The tiltable stage assembly of claim 1, wherein the tiltable stage has a maximum tilt angle of less than 15 degrees.

5. The tiltable stage assembly of claim 1, further comprising:

a hinge coupled between the base and the tiltable stage; and a torsion spring coupled to the hinge, wherein the torsion spring is configured to bias the tiltable stage to the initial position.

6. The tiltable stage assembly of claim 1 further comprising a roller bearing assembly coupled to the tiltable stage and to the base, wherein the roller bearing assembly defines an axis of rotation of the tiltable stage.

7. The tiltable stage assembly of claim 6, wherein the roller bearing assembly is positioned beneath the tiltable stage.

8. The tiltable stage assembly of claim 1, further comprising a detent, wherein the detent is configured to prevent motion of the tiltable stage until a predetermined threshold force is exceeded.

9. The tiltable stage assembly of claim 1, further comprising:

an intermediate frame disposed between the base and the tiltable stage;

a first roller bearing assembly coupled to the base and to the intermediate frame; and a second roller bearing assembly coupled to the intermediate frame and to the tiltable stage, wherein the first roller bearing assembly defines a first axis of rotation of the tiltable stage and the second roller bearing assembly defines a second axis of rotation of the tiltable stage, thereby providing the tiltable stage with at least two degrees of freedom.

10. The tiltable stage assembly of claim 9, wherein the second axis of rotation is positioned approximately 90 degrees to the first axis of rotation when the tiltable stage is in the initial position.

11. The tiltable stage assembly of claim 1, further comprising a motor operable move the tiltable stage from the initial position to the tilted position.

12. The tiltable stage assembly of claim 11, wherein the motor is disposed beneath the tiltable stage and is coupled to the tiltable stage via a linkage mechanism.

13. The tiltable stage assembly of claim 1, further comprising a second tiltable stage operably coupled to the base and positioned beneath the base.

14. The tiltable stage assembly of claim 1, wherein the tiltable stage comprises a retention device disposed on a top surface of the tiltable stage.

15. A system comprising:

a tiltable stage assembly comprising:

a base;

a tiltable stage operably coupled to the base and pivotable relative to the base, wherein the tiltable stage is moveable between an initial position and a tilted position, wherein the tiltable stage is parallel with the base in the initial position and is oriented at an angle to the base when in the tilted position, wherein the tiltable stage is biased to the initial position;

a hinge coupled between the base and the tiltable stage; and a torsion spring coupled to the hinge, wherein the torsion spring is configured to bias the tiltable stage to the initial position; and a robotic arm positioned within reach of the tiltable stage and configured to exert a downward force on the tiltable stage, thereby moving the tiltable stage from the initial position to the tilted position.

16. The system of claim 15, further comprising a roller bearing assembly coupled to the tiltable stage and to the base, wherein the roller bearing assembly defines an axis of rotation of the tiltable stage.

17. The system of claim 15, further comprising:

a motor operably coupled to the tiltable stage and configured to move the tiltable stage from the initial position to the tilted position.

18. The system of claim 17, further comprising a second tiltable stage operably coupled to the base.

* * * * *